United States Patent

[11] 3,556,051

| | | | |
|---|---|---|---|
| [72] | Inventor | John Gerard Noonan | |
| | | P. O. Box 5234, Dunedin, New Zealand | |
| [21] | Appl. No. | 875,561 | |
| [22] | Filed | Nov. 10, 1969 | |
| [45] | Patented | Jan. 19, 1971 | |
| [32] | Priority | Nov. 19, 1968 | |
| [33] | | New Zealand | |
| [31] | | No. 154533 | |

[54] METHODS OF FOSTERING ANIMALS
6 Claims, No Drawings

[52] U.S. Cl. ....................................................... 119/1,
424/326
[51] Int. Cl. ....................................................... A01k 67/00
[50] Field of Search ........................................... 119/1;
424/326, 324

[56] References Cited
UNITED STATES PATENTS
3,303,818  2/1967  Biehl .......................... 119/1

*Primary Examiner*—Aldrich F. Medbery
*Attorney*—Holman, Glascock, Downing, and Seebold ABSTRACT: A means of reducing the tendency of nonhuman foster mother animals to reject the young animal to be fostered by temporarily destroying or reducing to an ineffective level the foster mother's sense of smell using a nasal preparation with a local anesthetic in a liquid carrier having a substantial portion of a lower alcohol therein.

METHODS OF FOSTERING ANIMALS

This invention relates to the fostering of nonhuman animals.

The sheep farmer or shepherd during lambing is frequently faced with the problem of looking after a lamb which has lost its mother. The foundling lamb is potentially of considerable economic value but if it is to survive it must receive adequate care and attention. The most desired method of ensuring that this lamb is cared for is to select a foster ewe which will accept the young lamb as its own. The natural tendency is for the ewe to reject the strange lamb and in the past means have been proposed to reduce the tendency of the foster mother from rejecting the lamb. These include tying or otherwise restricting the movement of the foster mother, placing the skin or part thereof of the dead lamb belonging to the foster mother on the lamb to be fostered or applying a saturation odor to the lamb and the ewe. All these methods have considerable disadvantages and do not necessarily ensure that the foster mother will accept the foster lamb. The ability to ensure that the foster mother will accept a foster lamb is of considerable economic importance as lambs which would otherwise have been lost will be successfully reared by the foster ewe. As stated above the invention has particular application in sheep farming. However the invention would also apply to other domestic animals.

It is therefore an object of the present invention to provide a method of reducing the tendency of a nonhuman foster mother to reject a young animal to be fostered.

The present invention includes the use of a veterinary composition which will temporarily destroy or reduce to an ineffective level the foster mother's sense of smell.

Broadly the invention consists in a method of fostering nonhuman animals, said method comprising the steps of temporarily reducing to an ineffective level the foster mother's sense of smell by use of a local anesthetic and while the sense of smell is so reduced introducing the young animal to be fostered.

The veterinary composition used is preferably suitable for application as a nasal spray and comprises a liquid carrier consisting of distilled water and a lower alcohol having from 50 percent to 80 percent by volume of the lower alcohol and from 1 percent to 5 percent by weight of a liquid anesthetic selected from benzocaine, procaine, novocaine cinchocaine, lignocaine and xylocaine.

In the preferred form of the invention a veterinary preparation for nonhuman animals and particularly domestic animals such as sheep is made up using a liquid carrier of distilled water and a lower alcohol with the carrier including between 50 percent and 80 percent by volume of the lower alcohol. In this specification the term "lower alcohol" is intended to include alcohol having not more than four carbon atoms. The preferred lower alcohol used is methyl alcohol and the carrier preferably comprises 75 percent by volume of methyl alcohol and 25 percent by volume of distilled water.

A local anesthetic is dissolved in the carrier. The local anesthetic is selected from the following group of local anesthetics: benzocaine, procaine, novocaine, cinchocaine, lignocaine and xylocaine.

Preferably benzocaine is used and 1 percent to 5 percent by weight of the selected local anesthetic is dissolved in the carrier.

Preferably 2 percent by weight of benzocaine is dissolved in the carrier. The benzocaine or other selected local anesthetic is dissolved in the methyl alcohol. Once the benzocaine has been placed in the methyl alcohol the mixture is agitated in closed conditions to ensure the benzocaine is dissolved.

Preferably the mixture is prepared so that the ratio of benzocaine methyl alcohol does not exceed 87 troy grams per 15 fluid ounces.

The distilled water may then be added by gradual stages to an amount 25 percent by volume of the carrier used for the local anesthetic After each addition of distilled water the mixture is agitated, once again in closed conditions to prevent precipitation. It is important to avoid rapid addition of the distilled water otherwise precipitation will result. During the mixing process the temperature should not substantially exceed 70°F.

When so prepared the veterinary preparation may be conveniently packed as a nasal spray in half-fluid-ounce plastic squeeze-type nasal spray receptacles with evaporation-proof screw tops.

The veterinary preparation and nasal spray so made may be used on a domestic animal to temporarily destroy or reduce to an ineffective level the sense of smell of the animal. Thus if a preparation is applied to the foster mother the sense of smell of the mother is destroyed or reduced and a young animal to be fostered may be introduced to the foster mother when the sense of smell is so effected.

The use of the present invention is quite simple. A domestic animal, for example a ewe, is held in a standing position with its nose to the ground. The nasal spray is inserted in the nostril and squeezed twice in each nostril. This gives a sufficient does to destroy or reduce to an ineffective level for about one hour the ewe's sense of smell. A larger dose than that prescribed is not recommended, and may result in a coldlike condition and discomfort to the animal. No treatment is necessary for the lamb to be adopted. The lamb is merely placed beside the ewe immediately following her treatment with the spray and is normally accepted straight away. It is not necessary, except in very odd cases, to tie the ewe up after treatment. Care should be taken not to treat ewes in a lambing paddock closer to each other than 30 feet, otherwise confusion may result. As the ewe cannot detect the foreign odor of the new lamb she will not reject it and as the anesthetic gradually wears off the ewe is confronted by the faint but increasing odor of the new lamb. The gradual scent introduction combined with the mother's instinct and the fact that the ewe's previous scent recognition is forgotten or replaced leads to instant acceptance.

A further and important factor in the present invention is the particular carrier selected for the present invention. From a psychological point of view it is desirable for animals sense of smell to be curtailed suddenly and to this end some shock is desirable. The carrier in the preferred example as above described consists 75 percent by volume of methyl alcohol and this produces a stinging effect on the animal's nasal membrane. The alcohol evaporates quickly, especially in the nasal air passage leaving a film of local anesthetic coating on the membranes. The distilled water is also of considerably importance in ensuring the effective operation of the nasal spray. It is desirable for this amount of water to be provided to offset the drying effect of the mucous membrane caused by the evaporation of the alcohol. Without the water the nasal passage with following applications would tend to dry and the effects of the anesthetic be retarded as the anesthetic requires moisture to make a working contact with the tissues. Hence the carrier in the nasal spray is also of importance in ensuring the present invention operates effectively. It is difficult to measure the psychological effects of the stinging produced before the anethetizing but it is felt that there is strong evidence to support the view that this sudden shock and sting is instrumental in erasing the animals smell memory which has then become associated with something hurtful and rather unpleasant. This also assists in the acceptance in the gradually introduced smell or odor of the new foster lamb.

Experimental work was conducted using the present invention. Six sheep with their own lambs were taken and it was shown that after treatment the lambs could be swapped around among the sheep and the when the effects of the nasal spray according to the present invention wore off the sheep would accept the foster lamb even in the presence of its own natural mother.

A further advantage of the alcohol in the carrier is that the alcohol tends to act as a sterilizing agent and reduces the risk of infection being transferred to the animal.

The main advantages of the present invention are the ease of application and the ability to treat a foster mother so that it will be prepared to accept a foster lamb without any further action necessary after the simple treatment of the present invention. There is no offensive odor caused and no need to tie or otherwise restrain the ewes except in the most unusual circumstances. The nasal spray unit is small and easily portable and is economical to use as a half-ounce container will treat between 75 and 90 ewes.

I claim:

1. A method of fostering nonhuman animals, said method comprising the steps of temporarily reducing to an ineffective level the foster mother's sense of smell by use of a local anesthetic and while the sense of smell is so reduced introducing the young animal to be fostered.

2. A method as claim in claim 1 including the steps of temporarily reducing to an ineffective level the foster mother's sense of smell by applying a local anesthetic in a nasal spray.

3. A method as claimed in claim 1 including the step of producing a stinging sensation in the nasal membranes immediately before temporary reduction to an ineffective level of the foster mother's sense of smell.

4. A method as claimed in claim 3 including the step of applying the local anesthetic in a solution incorporating a substantial percentage of a lower alcohol.

5. A method as claimed in claim 4 wherein the solution is a liquid carrier consisting of distilled water and a lower alcohol having from 50 percent to 80 percent by volume of said lower alcohol and from 1 percent to 5 percent by weight of said local anesthetic which comprises one selected from benzocaine, procaine, novocaine, cinchocaine, lignocaine and xylocaine.

6. A method as claimed in claim 5 wherein a liquid carrier has 75 percent by volume of methyl alcohol and includes 2 percent by weight of said local anesthetic.